United States Patent [19]

Hutton et al.

[11] Patent Number: 4,602,139

[45] Date of Patent: Jul. 22, 1986

[54] INDUCTION BONDING METHOD AND APPARATUS

[76] Inventors: Roger L. Hutton, 3141 Pikewood Ct., Milford, Mich. 48042; John P. Williams, Jr., 10475 Moon Lake Ct., Pinckney, Mich. 48169

[21] Appl. No.: 748,391

[22] Filed: Jun. 24, 1985

Related U.S. Application Data

[63] Continuation-in-part of Ser. No. 655,684, Sep. 28, 1984, abandoned.

[51] Int. Cl.[4] ............................................. H05B 6/40
[52] U.S. Cl. ........................... 219/10.43; 219/10.53; 219/10.57; 219/10.73; 156/273.7; 156/274.2; 156/380.2
[58] Field of Search ............... 219/10.53, 10.57, 10.67, 219/10.69, 10.71, 10.73, 10.75, 10.79, 9.5, 10.41, 10.43, 85 A; 156/272.2, 273.3, 273.5, 273.7, 273.9, 274.2, 275.1, 275.3, 379.6, 379.7, 379.8, 379.9, 380.2, 380.4

[56] References Cited

U.S. PATENT DOCUMENTS

| | | | |
|---|---|---|---|
| 2,633,443 | 3/1953 | Langer | 156/272.2 |
| 3,172,798 | 3/1965 | Rosenbaum | 156/380.4 |
| 3,239,403 | 3/1966 | Williams et al. | 156/273.9 |
| 3,242,026 | 3/1966 | Saxton et al. | 156/273.7 |
| 3,396,258 | 8/1968 | Leatherman | 219/10.53 |
| 3,437,536 | 4/1969 | Vincent et al. | 156/78 |
| 3,454,442 | 7/1969 | Heller, Jr. | 156/275.7 |
| 3,467,806 | 9/1969 | Dixon | 219/10.73 |
| 3,556,887 | 1/1971 | Adcock et al. | 156/272.2 |
| 3,580,780 | 5/1971 | Klawunn et al. | 219/10.53 X |
| 3,725,630 | 4/1973 | Gagliardi | 219/10.79 |
| 3,727,022 | 4/1973 | Hamilton | 219/10.43 |
| 3,738,892 | 6/1973 | Curcio | 219/10.75 |
| 3,798,403 | 3/1974 | Mitchell et al. | 219/10.53 |
| 3,864,186 | 2/1975 | Balla | 156/272.2 |
| 3,916,055 | 10/1975 | Wagner | 156/272.4 |
| 4,155,794 | 5/1979 | Raabe et al. | 156/380.2 |
| 4,164,599 | 8/1979 | Kessler | 156/275.7 |
| 4,258,241 | 3/1981 | Soworowski | 219/10.71 |
| 4,323,748 | 4/1982 | Likins | 219/10.71 |
| 4,355,222 | 10/1982 | Geithman et al. | 219/10.57 |
| 4,410,575 | 10/1983 | Obayashi et al. | 156/275.3 |
| 4,451,316 | 5/1984 | Ishibashi et al. | 156/274.6 |
| 4,501,943 | 2/1985 | Lund | 219/10.43 |

*Primary Examiner*—Philip H. Leung
*Attorney, Agent, or Firm*—Barnes, Kisselle, Raisch, Choate, Whittemore & Hulbert

[57] ABSTRACT

A plastic resin between two portions of a sheet metal assembly is heated to a curing temperature to adhere the sheet metal portions together by induction heating of only portions of the sheet metal immediately adjacent the resin. The sheet metal assembly is received between a pair of fixtures with the portions to be heated disposed between a pair of generally opposed induction coils through which an alternating current having a frequency of at least about 5,000 Hz and preferably at least 50,000 Hz is passed for less than fifteen seconds. The fixtures do not rigidly clamp the sheet metal assembly and may be opened and closed to facilitate the insertion and removal of sheet metal assemblies.

22 Claims, 19 Drawing Figures

INDUCTION BONDING METHOD AND APPARATUS

REFERENCE TO CO-PENDING APPLICATION

This application is a continuation-in-part of co-pending U.S. application Ser. No. 06/655,684, filed Sept. 28, 1984, now abandoned.

FIELD OF THE INVENTION

This invention relates to the adhering together of sheet metal by a heat activated adhesive or plastic resin and more particularly to the bonding of a sheet metal assesmbly by rapidly heating an adhesive or resin to an elevated temperature to initiate at least partial curing and adhesion of the adhesive or resin.

BACKGROUND OF THE INVENTION

In manufacturing bodies for vehicles such as trucks, cars and buses, panels of sheet metal have been adhesively secured together by placing a ribbon of plastic resin, such as expoxy, between overlapped portions of the panels. Typically, the resin is cured to bond panels together by heating it to an elevated temperature. The resin has been cured by heating the whole assembly by passing it through a paint baking oven or by somewhat localized heating of portions of the assembly with infrared lamps or the direct flame of gas torches. All these approaches require several minutes to heat the assesmbly sufficiently to at least partially cure the resin. Moreover, this heating tends to significantly warp or distort the panels of the assembly which can only be partially controlled by firmly clamping the panels adjacent the ribbon of epoxy in rigid fixtures.

SUMMARY OF THE INVENTION

In accordance with this invention, an adhesive or plastic resin in a sheet metal assembly is heated to a curing temperature by rapidly induction heating only portions of the assembly immediately adjacent the adhesive or resin. These portions of the assembly are rapidly heated by being disposed between at least one pair of generally opposed induction coils through which an alternating current is passed for not more than about fifteen seconds. To avoid distortion of the assembly, only areas of the sheet metal immediately adjacent the resin are significantly heated by utilizing a high frequency alternating current desirably of at least 5,000 Hz. Preferably, to more rapidly heat the sheet metal this current has a frequency of at least 50,000 Hz. To provide a short cycle time, this current preferably has a high energy or power level of at least about 350 watts per square inch of the ribbon of adhesive or resin to be heated to a curing temperature. To accurately locate and position the assembly and induction coils relative to each other, preferably the coils are received in fixtures. To facilitate inserting and removing the sheet metal assembly from between the coils, preferably at least one of the fixtures may be advanced and retracted with respect to the other fixture.

To facilitate processing of various panel assemblies, preferably the apparatus embodying this invention has a plurality of pairs of coil fixtures which can be readily transferred between idle and work stations. Preferably, each pair of fixtures has electrical connectors which permit the coils of the fixtures to be energized only when the fixtures are fully closed.

Objects, features and advantages of this invention are to provide a method and apparatus for at least partially heat curing a resin in a sheet metal assembly which is very rapid and hence, highly suited for mass production operations, very energy efficient, does not significantly distort or warp the assembly, eliminates the need to clamp the assembly in fixtures, and is simple, reliable, dependable, easy to use, and does not require highly skilled labor.

DETAILED DESCRIPTION OF THE DRAWINGS

These and other objects, features and advantages of this invention will be apparent from the following detailed description, appended claims and accompanying drawings in which:

DETAILED DESCRIPTION

Figure 1:
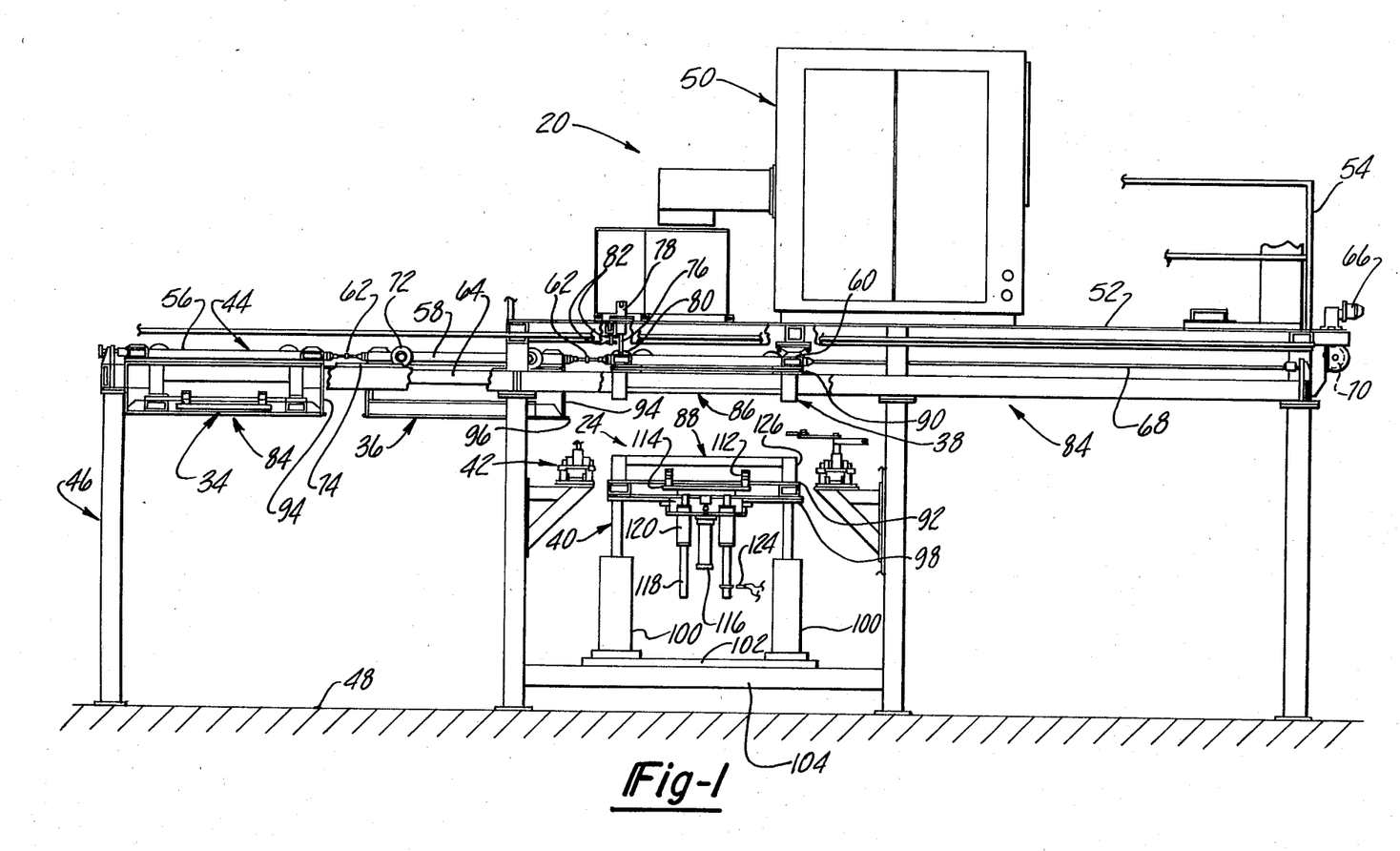
FIG. 1 is a side view with portions broken away of an apparatus for carrying out this invention.
Figure 2:
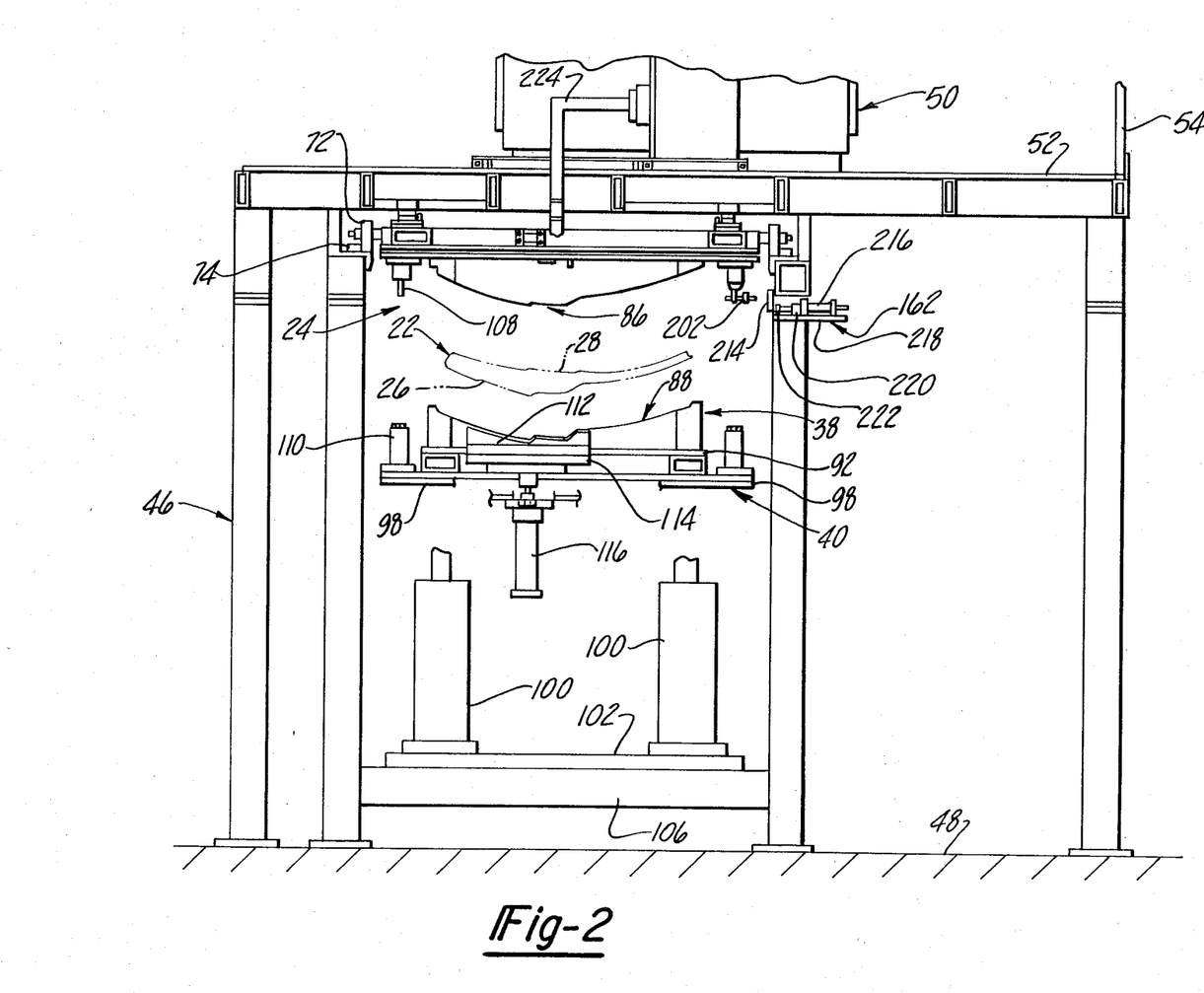
FIG. 2 is an end view with portions broken away of the apparatus of FIG. 1.
Figures 3, 5, 6:
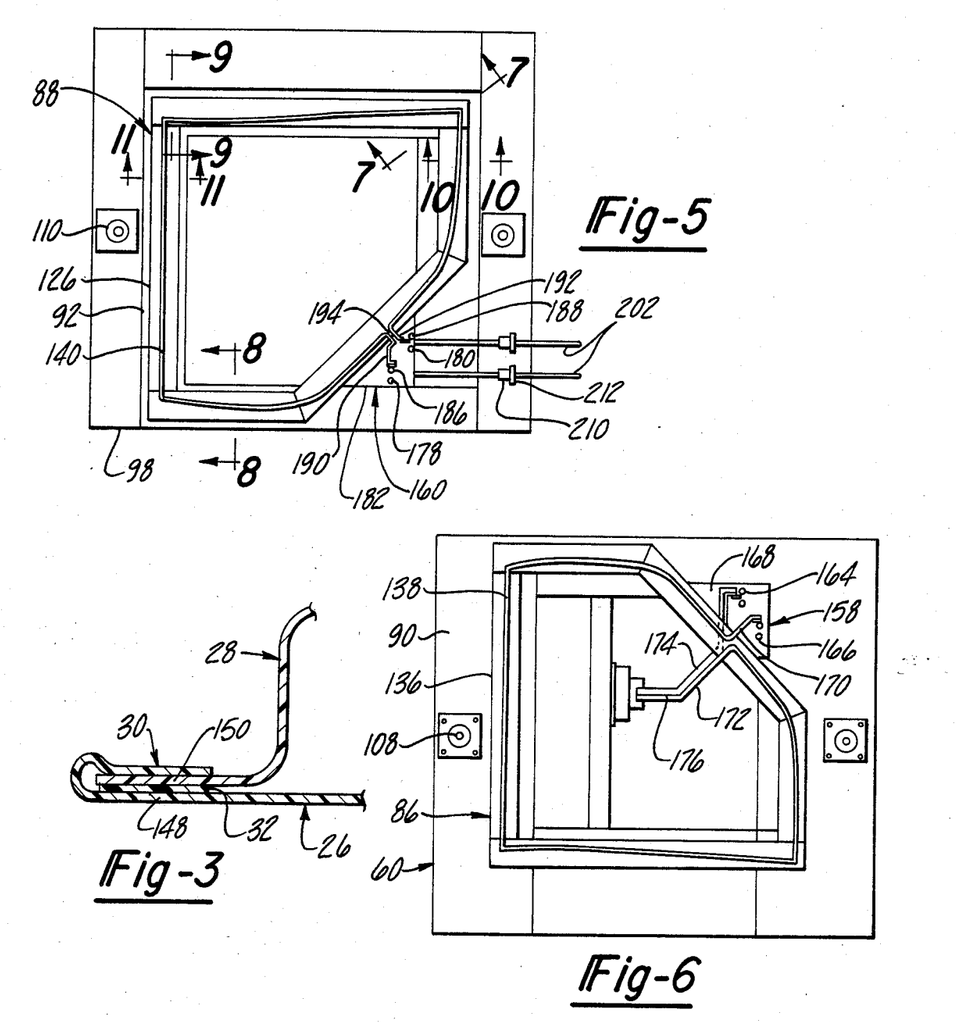
FIG. 3 is an enlarged fragmentary sectional view of a sheet metal vehicle door assembly.
FIG. 5 is a plan view of the lower fixture taken generally on line 5—5 of FIG. 4.
FIG. 6 is a plan view of the upper fixture taken generally on line 6—6 of FIG. 4.
Figure 4:
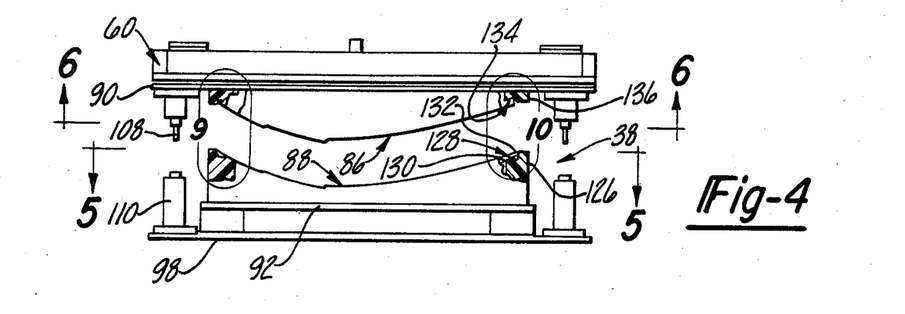
FIG. 4 is an enlarged side view with portions broken away and in section of a pair of coil fixtures of the apparatus of FIG. 1.
Figure 7:
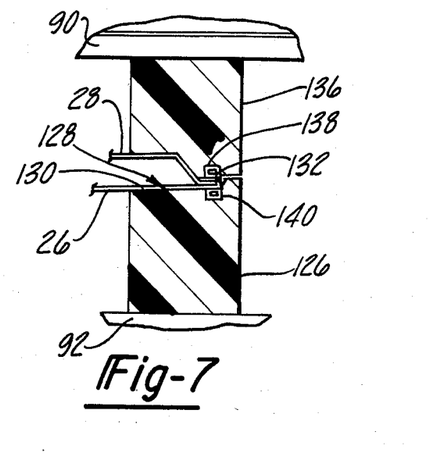
FIGS. 7, 8, 9, 10 and 11 are enlarged fragmentary sectional views of the pair of fixtures shown in closed relation with a vehicle door assembly therein, taken generally on lines 7—7, 8—8, 9—9, 10—10 and 11—11 of FIG. 5.
Figure 8:
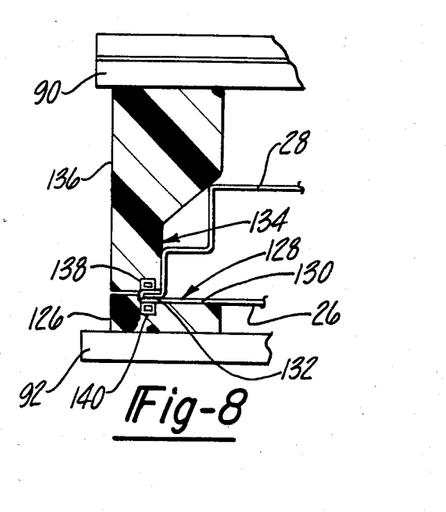
Figure 9:
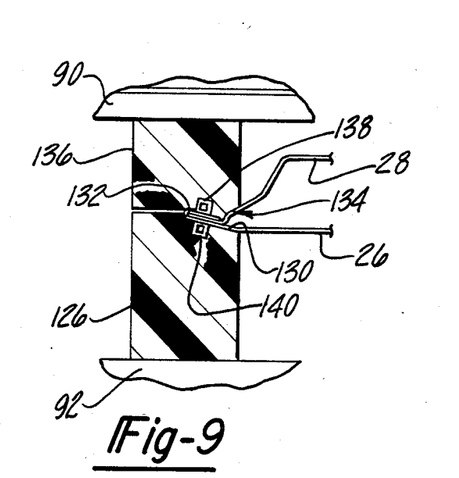
Figure 10:
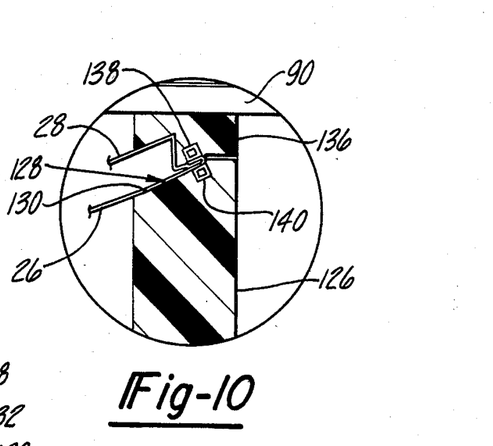
Figure 11:
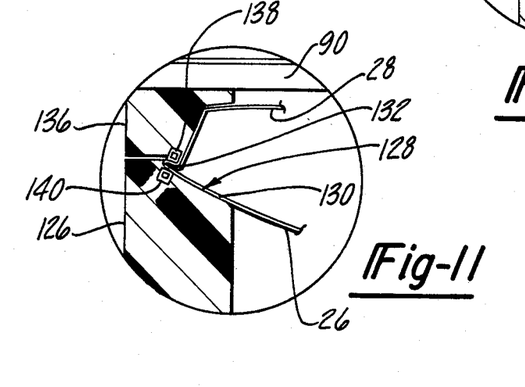

Referring in more detail to the drawings, FIGS. 1 and 2 illustrate an induction apparatus 20 embodying this invention for bonding a sheet metal assembly such as a car door 22 in a workstation 24. The door assembly has an outer sheet metal panel 26 and an inner sheet metal frame panel 28 with a hem flange 30 (FIG. 3) around its periphery. To secure the panels together a series of droplets or a ribbon of a heat activated plastic adhesive or resin 32 is disposed between the panels and cured or bonded to the panels. The resin is at least partially cured to bond the panels together by being heated to an elevated temperature usually in the range of about 200° to 500° F. and preferably 300° to 400° F.

Suitable adhesives or resins include epoxies, acrylics and polyvinyl chlorides. For many applications suitable epoxy resins are available from American Cyanamid Company, Bloomingdale Plant, Haverde Grace, Md. 21078 under the trade designation Cybond 4533-228 and R. & D Chemical Co. of 3290 West Big Beaver Road, Troy, Mich. 48084 as a distributor of Ciba-Geigy Corp. epoxy resin under its trade designation XB 3131, and suitable polyvinyl chloride resins are available from Uniseal Inc. of 1800 West Maryland Street, Evansville, Ind. 47712 under the trade designation AP 116 D.

Portions of the door assembly adjacent the resin are heated to at least partially cure the resin in one of three pairs of coil fixtures 34, 36 and 38 received in the work station. If this heating does not fully cure the resin, it can be fully cured by further heating of the assembly such as when it passes through a baking oven after being spray painted to dry the paint. To facilitate rapidly changing the apparatus to process different size sheet metal assemblies, each pair of fixtures is constructed and arranged to receive a vehicle door or other sheet metal assembly having a different size, shape and/or configuration.

The coil fixtures in the work station are opened and closed by a lift mechanism 40. Each door assembly is moved into and out of the coil fixtures in the work station by a workpiece conveyor 42. The coil fixtures are moved into and out of the work station by an overhead transfer mechanism 44 carried by a frame 46 of the apparatus secured to a floor 48. A power supply cabinet 50 is received on a catwalk 52 on top of the frame and is encircled by a hand rail 54.

TRANSFER MECHANISM

In accordance with one feature of this invention, to facilitate quick and easy change over from running one sheet metal assembly to another, transfer mechanism 44 can move any one of the three pair of fixtures 34, 36 or 38 out of the work station 24 and another pair of the fixtures into the work station. The transfer mechanism moves the fixtures between the work station 24 and idle stations 84 on each side of the work station. The transfer mechanism has three carriages 56, 58 and 60 connected together by turnbuckles 62 carried by a pair of rails 64 fixed to the frame. The carriages are moved in unison by a drive motor 66 mounted on the frame and a loop of drive chain 68 received over sprockets 70 and connected at its ends to the carriages 56 and 60. Each carriage has four wheels 72 which are guided and retained on the rails by keepers 74. The carriages are accurately located in the work station by a manually actuated locator pin 76 slidably carried by a housing 78 fixed to the frame. When extended the pin 76 is received in a bushing 80 fixed to each carriage. An indication of when the pin is extended to locate and retain a carriage in the work station is provided by proximity switches 82.

COIL FIXTURES

As shown in FIG. 1, each pair of fixtures 34, 36 and 38 has complimentary upper and lower fixtures 86 and 88 mounted on bolster plates 90 and 92. The upper fixture of each pair and its bolster plate is secured to its associated carriage 56, 58 and 60. When in an idle station, the lower fixture of each pair is suspended from its upper fixture by hanger straps 94 secured to the fixtures by cap screws 96. When a pair of fixtures is in the work station, the hanger straps 94 are removed and the lower fixture is secured to a platen 98 of the lift mechanism 40. To close and open the fixtures in the work station, the platen is raised and lowered by hydraulic cylinders 100 secured to a mounting plate 102 secured to cross beams 104 and 106 fixed to the frame 46. When closed, the upper and lower fixtures of each pair are accurately aligned by opposed locator pins 108 and bushings 110 fixed to their bolster plates.

Each door assembly is lifted from the workpiece conveyor 42 by a pre-lift cradle 112 secured to a table 114 which is carried by the lift mechanism 40. The cradle and table are raised and lowered by a hydraulic cylinder 116 secured to the platen 98. The table is guided by a pair of rods 118 fixed thereto and slidably received in bushings 120 fixed to the platen. The raised and lowered positions of the table are sensed by proximity switches 122 and 124.

As the lower fixture is raised by the lift mechanism 40, the cradle 112 is retracted so that the lower fixture picks up the sheet metal door assembly 22 from the cradle and positions it between the closed fixtures to be bonded. After the assembly is bonded, the lift mechanism 40 is lowered to open the fixtures, while the cradle 112 is raised to lift the bonded assembly from the lower fixture so that it can be carried away by the workpiece conveyor.

In accordance with another feature of this invention, the sheet metal assembly to be bonded is accurately located by the pair of fixtures 34, 36 or 38 in the work station when closed without firmly clamping the panels in the area in which they are to be bonded. The sheet metal door assembly 22 is supported in the lower fixture 88 by an upstanding wall 126 which extends around and underlies the periphery of the door assembly. To accurately locate the door assembly 22 in the lower fixture, it is received in a recess 128 in the upper face of the wall 126. As shown in FIGS. 7-11, the recess has a bottom face 130 with a contour complementary to and mating with an overlying portion of the outer panel 26 of the door and a sharp edge 132 extending around and closely adjacent to the peripheral edge of the door. To further facilitate accurately locating the door assembly, preferably the upper fixture also has a recess 134 in a depending peripheral wall 136 which is complimentary to and mates with an underlying portion of the inner frame panel 28 of the door assembly.

In accordance with another feature of this invention, as shown in FIGS. 7-11 and 14, each pair of fixtures, when closed, positions induction coils on generally opposite sides of the sheet metal assembly adjacent the ribbon of plastic resin to be bonded or cured. The upper and lower fixtures each have an induction coil 138 and 140 received in a groove 142 and 144 in the upper and lower peripheral walls 126 and 130 of the fixtures. The induction coils extend longitudinally generally along the path of the ribbon of plastic resin to be heated. The coils are of an electrically conductive material such as copper and in the form of a hollow tube so that a cooling fluid, such as water, can be circulated through them to prevent them from becoming over heated when in use.

Figures 12, 13, 14:
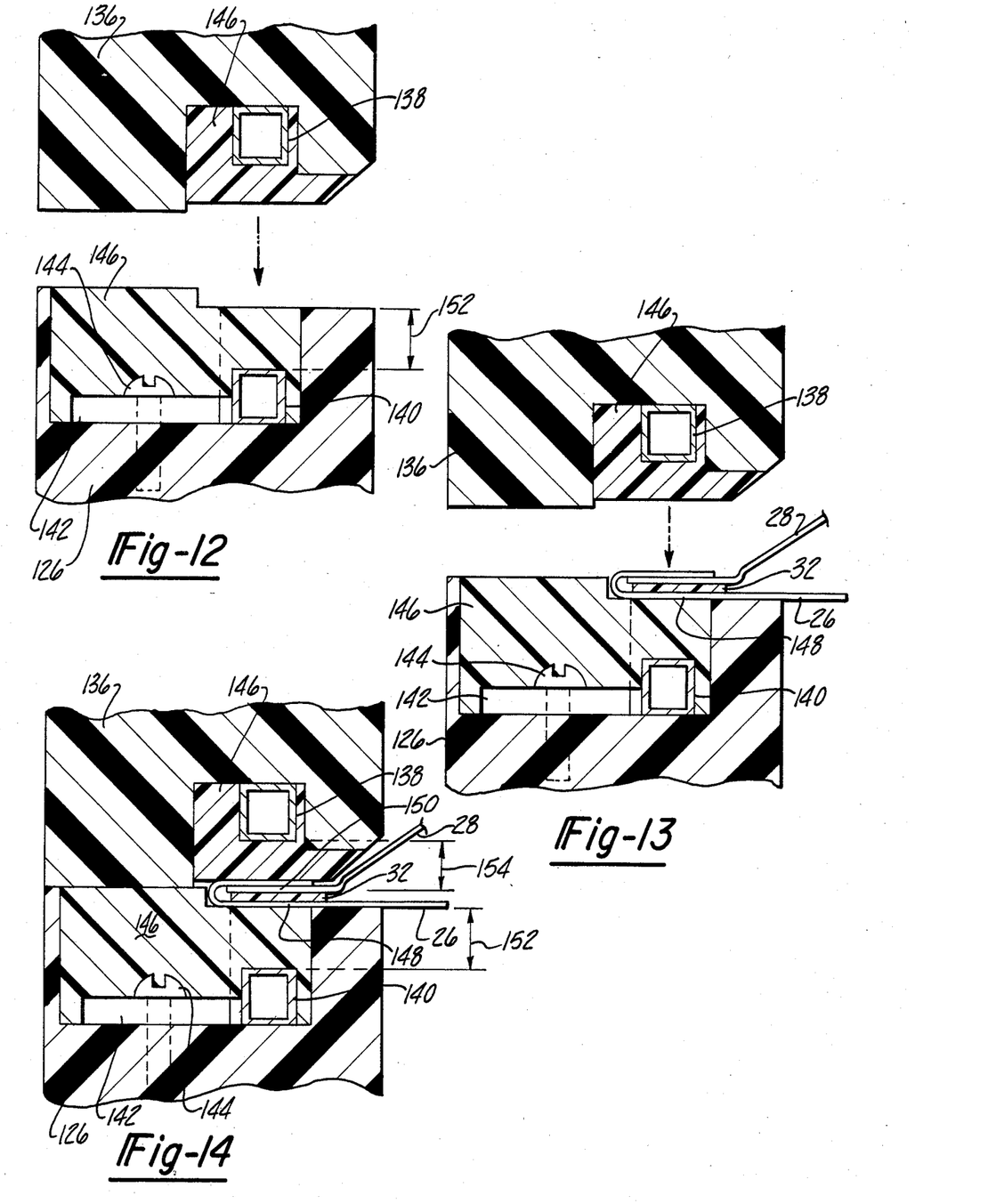
FIG. 12 is an enlarged fragmentary sectional view of the fixtures when open and showing in detail the mounting of the coils in the fixtures.
FIG. 13 is an enlarged fragmentary sectional view similar to FIG. 12 showing a door assembly to be bonded received in the lower fixture.
FIG. 14 is an enlarged fragmentary sectional view similar to FIG. 13 showing the fixtures when closed with the door assembly therein.

As shown in FIGS. 12-14, preferably the coils are mounted in the grooves by spaced apart tabs 142 secured by machine screws 144 and then potted in the grooves with an electrically insulating material 146 such as RTV rubber. To insure that the portion of the door assembly received between the fixtures is not rigidly clamped, preferably the potting material 146 in at least the upper fixture is resilient or elastic and is the only portion of the upper fixture which directly bears on the door assembly in the area to be bonded. Another way of insuring that the fixtures do not rigidly clamp the sheet metal assembly is to provide a slight clearance between the upper fixture and the door assembly in the area to be bonded. To further insure that the induction coils are electrically insulated from each other, the door assembly, and operating personnel, preferably the peripheral walls 126 and 136 of the fixtures are also made of an electrically insulating material and completely enclose the coils and the door assembly. These walls should also be rigid and able to withstand without deterioration elevated temperatures of up to about 400° F. A suitable material for making these walls is an epoxy resin sold under the trade name Haysite by the Haysite Reinforced Plastics Division of Zurn Industries, Inc. of 5599 Newperry Highway, Erie, Pa. 16509.

LOCATION OF COILS

In accordance with a further feature of this invention, each coil is spaced from the door panel assembly to maximize its effectiveness and efficiency in generating heat in those portions of the sheet metal from which the heat will be most effectively transferred to the plastic resin to be cured. As shown in FIG. 14, heat will be most efficiently transferred to the resin 32 from the underlying portion 148 of the outer metal panel 26 and the overlying portion 150 of the inner frame panel 28. The spacing between a piece of metal and an induction coil at which the metal is most effectively and efficiently heated, is primarily a function of the frequency of the alternating current applied to the coil and the size in cross section of the coil. Thus, for upper and lower coils 138 and 140 of the same cross sectional size to which power of the same frequency is applied, the distance 152 between the lower coil and the metal portion 148 should be substantially equal to the distance 124 between the upper coil and the metal portion 150 to maximize the effectiveness and efficiency of heating the resin. For coils having a square cross section of about one-quarter inch on a side, the distances 152 and 154 are usually in the range of about 0.350 to 0.030 of an inch, typically about 0.250 to 0.040 of an inch, and preferably about 0.120 to 0.060 of an inch for a frequency of the alternating current applied to the coils in the range of about 5 KHz to 1,000 KHz with the distance decreasing as the frequency increases. Typically, with this size coils and current having a frequency of about 500 KHz this distance is usually about 0.100 of an inch. As exaggerated in FIGS. 12-14, for a hem flange the most effective and efficient spacing of the coils results in the lower and upper coils being located at different distances from the exposed or outer faces of the hem flange. Usually it is desirable to empirically determine the exact distances 152 and 154 for a given size and configuration of lower and upper coils, door assembly, resin location in the hem flange, and frequency and power of alternating current applied to the coils.

When bonding together a sheet metal assembly having a sharp bend, sometimes the coils cannot be spaced a uniform distance from the metal to be heated in the area of the bend which results in localized spots or areas of the sheet metal being too close to one of the coils and hence, being excessively heated to a temperature which burns the resin and/or metal and distorts the metal. To prevent excessive heating in these localized areas, a small portion of one or both of the coils can be shielded with a ferrite material or laminated steel plates to decrease the amount of energy radiated by the coils and hence eliminate the localized spot or area of excessive heating. A suitable ferrite material is sold under the tradename Ferrocon by Polymer Corporation of Reading, Pa. 19603.

ELECTRIC DISCONNECTOR

In accordance with another feature of this invention, to insure the safety of personnel operating the apparatus, the induction coils 138 and 140 of only the pair of fixtures in the work station are electrically connected by a disconnector 156 so that a currrent can be applied to the coils only when the fixtures are closed. As shown in FIG. 2, the disconnector 156 has a plug 158 carried by the upper fixture, a receptacle 16 carried by the lower fixture, and an actuator 162 mounted on the frame 46. As shown in FIGS. 5 and 15-17, the plug 158 has a pair of spaced apart copper conductor pins 164 and 166 mounted on a carrier block 168 of electrically insulating material such as epoxy resin secured by cap screws to the bolster plate of the lower fixture. One end of the upper coil 138 is electrically connected to the conductor pin 166 by a conduit or buss 170 and the other end of the coil is connected to the power supply by a conduit or buss 172. The other pin 164 is also connected to the power supply by a conduit 174. The conduits 172 and 174 are separated by a strip 176 of an electrically insulating material such as teflon. The conduits are hollow tubes of copper through which a cooling fluid such as water is circulated.

Figure 15:
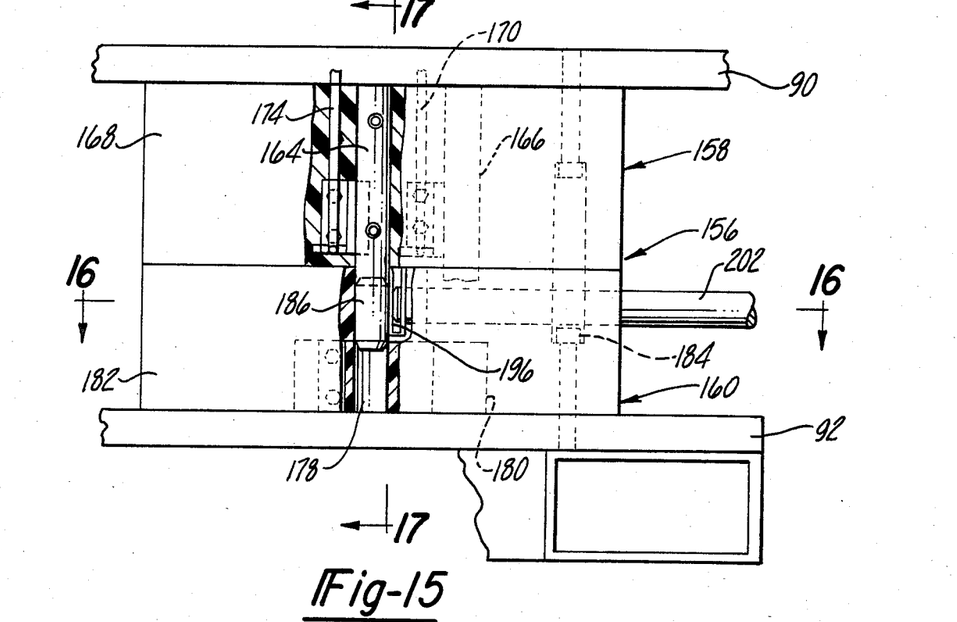
FIG. 15 is a fragmentary side view of an electric connector for the coils of the pair of fixtures of FIG. 4.

When the fixtures are closed, the pins 164 and 166 of the plug project into socket holes 178 and 180 in a block 182 of an electrically insulating material such as epoxy of the receptacle 160. The block 182 is secured by cap screws 184 to the bolster plate of the upper fixture. As shown in FIGS. 13-15 the receptacle also has a pair of copper conductor pins 186 and 188 received in blind holes in the block and each extending generally parallel to and spaced from the plug pins 164 and 166. The receptacle pin 186 is electrically connected to one end of the lower coil 140 by a conduit 190. The other end of the lower coil is connected to the other pin 188 by a conduit 192. The conduits are separated by a strip 194 of teflon, and are hollow tubes of copper through which a cooling fluid such as water is circulated.

Figure 16:
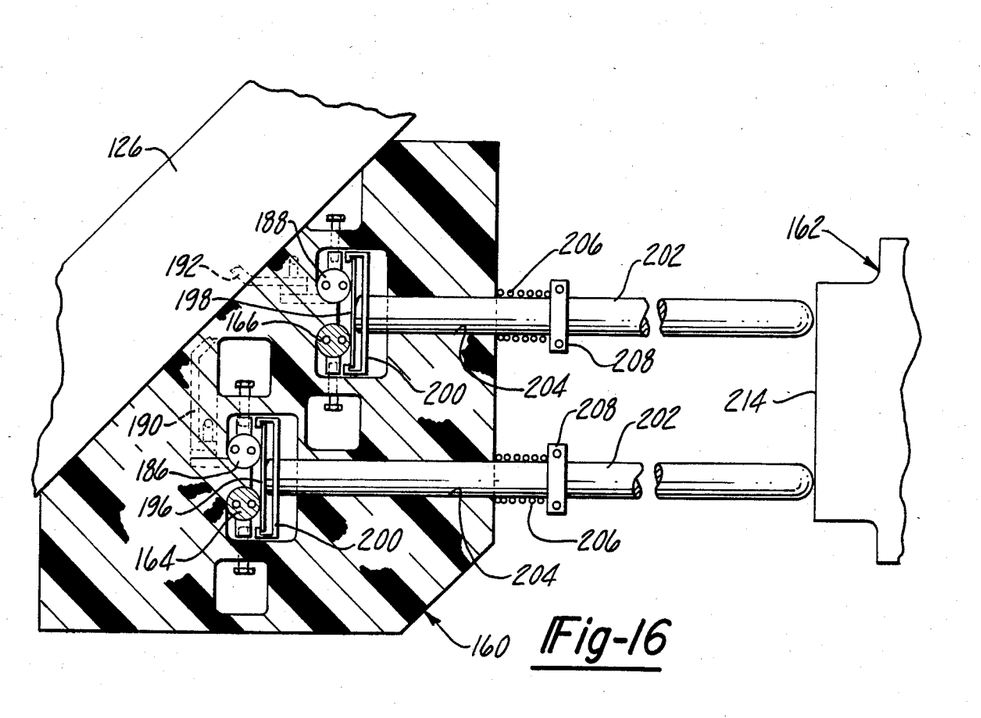
FIG. 16 is a fragmentary sectional view of the electric connector taken generally on line 16—16 of FIG. 15.

When the fixtures are closed so that the pins of the plug extend into the receptacle, the coils are connected in series with each other by movement of a beryllium copper alloy contactor plate 198 into simutaneous engagement of the pins 164 and 186 and movement of a beryllium copper alloy contactor plate 198 into simultaneous engagement with the pins 166 and 188. Each contactor plate is removably mounted in a carrier 200 of an insulating material which is connected to one end of an actuator rod 202 slidably received in a bore 204 in the mounting block. Each contactor plate is yieldably urged away from its associated conductor pins by a coil spring 206 received on the rod with its ends bearing on the block and a clamp 208 secued to the rod. To limit the extent in which each actuator rod can move away from the conductor pins an adjustable collar 210 is secured to the rod to bear on a block 212 in which the rod is also journaled. As shown in FIGS. 2 and 16, when the fixtures are closed, the rods 202 can be advanced to close the contactor plates by the actuator 162. The actuator has a pressure pad 214 which is advanced and retarcted by a pneumatic cylinder 216 received on a mounting plate 218 fixed to the frame 46. Movement of the actuator to close and open the contactor plates in sensed by proximity switches 220 and 222.

Figures 17, 18:
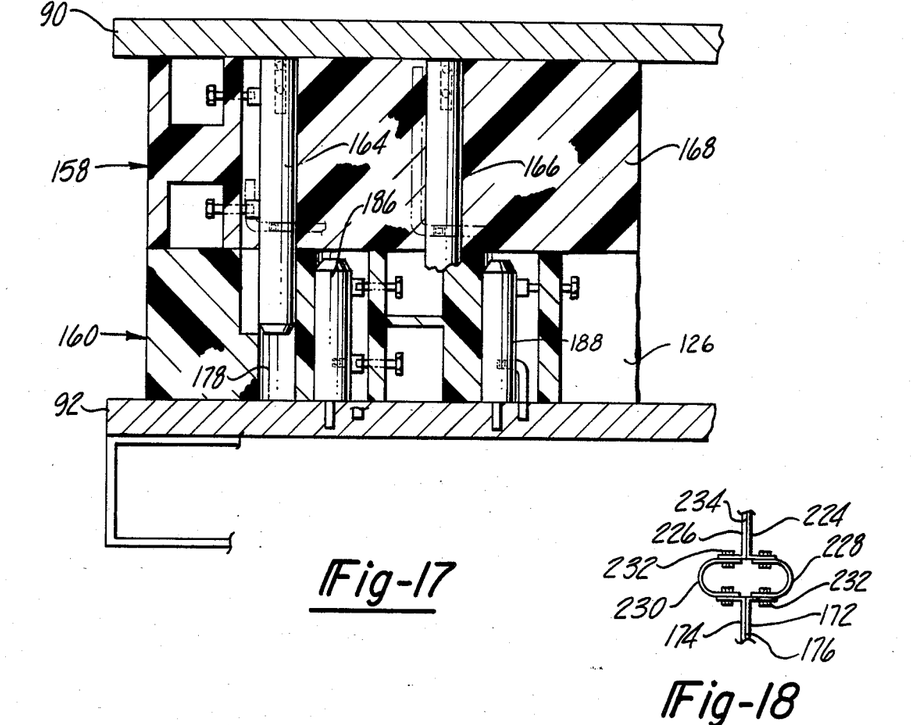
FIG. 17 is a fragmentary sectional view of the electric connector taken generally on line 17—17 of FIG. 15.
FIG. 18 is a fragmentary side view of shunts connecting the coils to a power supply.

As shown in FIGS. 2 and 18, to facilitate connecting and disconnecting each pair of fixtures 34, 36 and 38 with the power supply, the conduits 172 and 174 of each upper fixture are connected to power supply copper conduits 224 and 226 by flexible copper shunts 228 and 230 releasably secured to the conduits by bolts and nuts 232. The power supply conduits are hollow tubes through which a cooling fluid is circulated and are separated by a strip of electrically insulating material 234 such as teflon.

POWER SUPPLY

In accordance with another feature of this invention, to rapidly heat only the portions of the door assembly immediately adjacent the resin a preferably high frequency alternating current is applied to the coils at a high energy level or power for a short period of time. For applications where very rapid heating is unnecessary a current with a frequency of about 5,000 Hz can be used. For applications where rapid heating is desirable or necessary, an alternating current is used with a radio frequency of usually at least 50 KHz, desirably in the range of 100 to 1000 KHz, and preferably about 200 to 700 KHz. The energy level or power of this current is about 350 to 1250, desirably about 500 to 1000, and preferably 650 to 850 watts per square inch of the ribbon of resin. This high frequency current is applied for only a short period of time of not more than 15 seconds, desirably less than 10 seconds, and preferably about 1 to 6 seconds.

Figure 19:
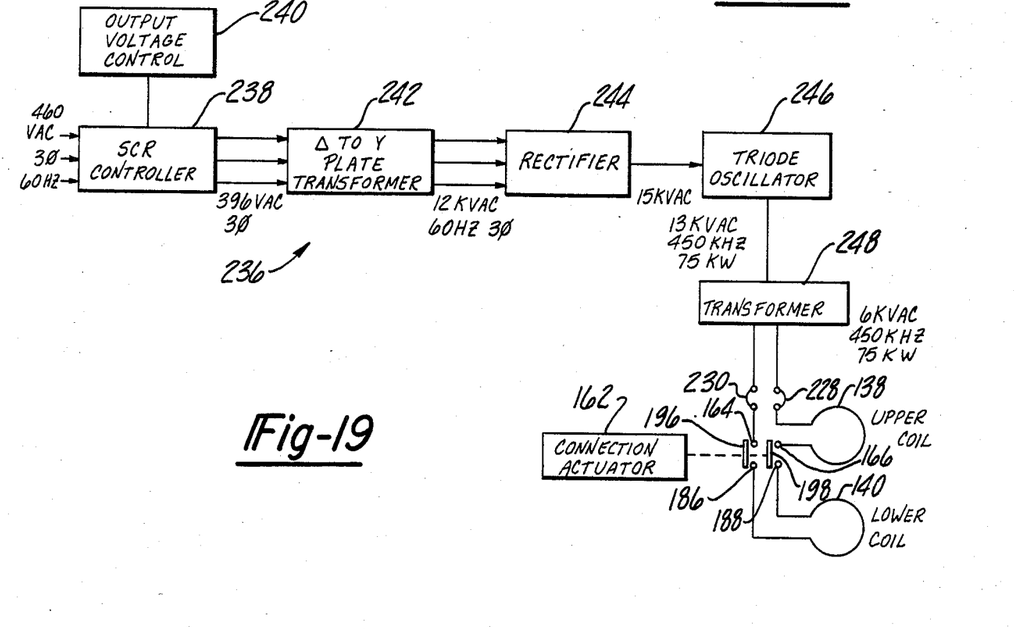
FIG. 19 is a block diagram of a power supply producing a high frequency alternating current supplied to the coils of the fixtures.

A suitable power supply 236 for producing this alternating current is housed in the cabinets 50. The coils are preferably connected in series with this power supply although they can be connected in parallel. A block diagram of this power supply 236 is shown in FIG. 19 in which utility or plant electric power at 460 volts AC, 60 Hz and three phase is fed to a water cooled SCR controller 238 through suitable circuit breakers, interrupters and filter capacitors (not shown). Preferably, this SCR controller is a model 304-087-6 controller and model 359-027 current limiter marketed by the Robicon Division of Barber Coleman Company of P.O. Box 360247M, Pittsburgh, Pa. 25251. The controller 238 provides a regulated nominal output of 396 volts AC independent of voltage variations of up to ±10% in the three input phases. A manually variable control 240 adjusts or "fine tunes" the output voltage of the controller and hence, the overall power supply 236.

The three phase output of the SCR controller is fed to the primary windings of a Delta-to-Wye plate transformer 242 through surge suppressors (not shown). The secondary windings of the transformer 242 supply three phase power at 12,000 volts AC and 60 Hz to a rectifier bank 244 which is a series of diodes. The output of the rectifier bank of 15,000 volts DC is fed to a water cooled triode oscillator having a resonant tank circuit which includes a primary winding of a single phase transformer 248. The secondary winding of the transformer 248 is connected to the upper and lower coils in series, when the fixtures are closed and connected by the lug 158, receptacle 160, and contactor actuator 162. Thus, the transformer 248 and the induction coils form part of the oscillator tank circuit.

The triode of the oslcillator has a grid electromagnetically connected to the tank circuit which causes the oscillator to resonate in tune with the tank circuit. The resonance turns the output of the triode on and off rapidly to produce a single phase alternating current having a high frequency in the range of about 50 KHz to about 500 KHz.

The turns ratio of the primary winding to the secondary winding of the transformer 248 is selected to match the load created by the induction coils and the sheet metal assembly being heated by them. The turns ratio is usually in the range of about 5:1 to 2:1. For example, in one working embodiment the turns ratio is 13:6 so that the output of the oscillator of 13,000 volts AC, 450 KHz at 75 KW is stepped down by the transformer 248 to 6,000 volts AC, 450 KHz, 75 KW which is applied to the induction coils when connected in series. The alternating current is applied to the coils to heat the resin of a sheet metal assembly for a short period of time or cyle of less than 15 seconds, often less than 4 seconds and usually less than 2 seconds.

The bonding apparatus 20 also has a number of electric and electrohydraulic circuits and components for cycling and operating it which have not been described because they are unnecessary for a complete understanding of this invention.

SETUP AND USE

In use, apparatus 20 is connected to a suitable source of hydraulic fluid under pressure, air under pressure, and to plant or utility electric power. The apparatus is set up to bond a sheet metal assembly such as vehicle doors 22 by moving the appropriate pair of fixtures such as the pair 38 into the work station 24. The desired fixture is transferred into the work station and the remaining fixtures into idle stations by energizing the motor 66 to move the carriages 56, 58 and 60 along the rails 64 so that the carriage 60 with the pair of fixtures 38 is in the work station 24. After the motor 42 is de-energized, the carrier 60 and the pair of fixtures 38 are accurately located and retained in the work station by manually advancing and engaging the locator pin 52 in the bushing 80 in the carriage. The lower fixture 88 is released from the upper fixture 86 by removing the hanger strap 94 and is secured by bolts (not shown) to the platen 98 of the lift mechanism 40.

With the lift mechanism 40 and pre-lift cradle 112 lowered by retraction of the pistons in the cylinders 100 and 116 as indicated by the proximity switch 124, a sheet metal door assembly 28 to be bonded is transferred between the open fixtures by the workpiece conveyor 42. The pre-lift cradle 112 is advanced by energizing cylinder 116 to lift the door assembly from the conveyor 42, and then the lower fixture is raised by energizing cylinders 100 to close the fixtures with the door assembly therebetween while lowering the pre-lift cradle 112. Closing of the fixtures also inserts the conductor pins of the plug 158 into the receptacle 160. After the fixtures are closed, the coils 138 and 140 of the fixtures are electrically connected to the output of the power supply 236 through the secondary of the transformer 248 by energizing the air cylinder 216 of the actuator 162 to advance the rods 202 to force the contactor plates 196 into engagement with the conductor pins of the plug and receptacle.

After the proximity switch 222 indicates the contactor rods and plates are advanced and hence the coils are electrically connected, a high frequency current produced by the power supply 236 is applied to the induction coils 136 and 138 for a short period of time, preferably less than 2 seconds, to heat the plastic resin 32 in the door assembly to a curing temperature. The induction coils heat the metal portions 148 and 150 of the door assembly adjacent the ribbon of resin 32 to an elevated temperature and at least a portion of the heat is transferred, primarily by conduction, to the ribbon of resin which causes the resin to become at least partially cured. Frequently, the door assembly is subsequently painted and then passed through a baking oven which both dries the paint and completes curing of the resin in the assembly. However, if desired, the resin can usually be heated sufficiently in the bonding apparatus 20 to become completely cured.

After the cycle time for energizing the coils is completed, the current from the power supply is switched off by a relay or other switching device (not shown) and then the contactor actuator 162 is retracted by energizing air cylinder 216 to retract its piston. After the proximity switch 220 indicates the actuator 162 is retracted, the fixtures are opened by energizing the cylinders 100 to move the lower fixture 140 away from the upper fixture 138. As the fixtures are opened, the cradle 112 is raised to lift the bonded assembly from the lower fixture by energizing the hydraulic cylinder 116 to advance its piston. The bonded door assembly is lifted sufficiently from the lower fixture so that it can be engaged and removed from the work station by the workpiece conveyor 42. Thereafter, another door assembly 22 to be bonded is transferred between the open fixtures by the workpiece conveyor 42 and another cycle of the bonding apparatus 20 is initiated.

We claim:

1. A method of bonding together an assembly of at least two overlapped portions of sheet metal with a ribbon of plastic resin therebetween which can be cured by heating to an elevated temperature, which method comprises: disposing a pair of induction coils of an electrically conductive metal in spaced apart and generally opposed relation to each other and on generally opposite sides of the overlapped portions of sheet metal with the resin therebetween with each of said coils extending generally along and adjacent the ribbon of plastic resin, lying closely adjacent to at least one of the overlapped sheet metal portions and disengaged and spaced from all the sheet metal portions; applying to both of said coils an alternating current for a period of time of not more than fifteen seconds and at a high enough frequency to heat by induction to a temperature of at least 200° F. only the portions of the sheet metal immediately adjacent the ribbon of resin; and supporting the assembly with the overlapped portions of sheet metal and the ribbon in such relationship to said coils without any substantial restraining of the overlapped sheet metal portions from flexing and moving due to being heated to an elevated temperature by the current applied to said coils and while subsequently cooling sufficiently for the resin to at least partially bond them together, whereby the temperature of the resin between the sheet metal portions is raised to a curing temperature and the resin is at least partially cured to bond the two pieces of overlapped sheet metal together without any significant distortion or warping of the assembly.

2. The method of claim 1 wherein the current applied to said coils has a frequency of at least about 5,000 Hz and a power of at least about 350 watts per square inch of the ribbon of resin to be bonded to the pieces of sheet metal.

3. The method of claim 1 wherein each coil is spaced about 0.030 to 0.350 of an inch from one metal portion engaging the plastic resin.

4. The method of claim 1 which also comprises having the coils electrically connected in series when the current is applied to the coils.

5. The method of claim 1 wherein the current applied to said coils has a frequency of at least about 50,000 Hz and such period of time is not more than about six seconds.

6. The method of claim 1 which also comprises retracting the coils, moving the assembly of sheet metal to be bonded together between the retracted coils, moving the coils toward each other with the sheet metal assembly therebetween to position both of the coils adjacent opposite sides of the assembly, electrically connecting the coils, applying the current to the coils, and thereafter electrically disconnecting the coils from each other, retracting the coils, and removing the assembly from between the coils.

7. An apparatus for bonding together an assembly of overlapping portions of sheet metal with an elongate ribbon of plastic resin therebetween the apparatus comprising: a pair of induction coils of an electrically conductive metal constructed and arranged to be disposed in spaced apart and generally opposed relation to each other and on opposite sides of the overlapping portions with the resin therebetween, each coil extending generally along and adjacent the elongate ribbon of plastic resin, lying closely adjacent to at least one of the overlapped sheet metal portions and being disengaged and spaced from all the sheet metal portions, a power supply producing an alternating current having a frequency high enough so that when it is applied to both of said coils for not more than about fifteen seconds they will heat by induction to a temperature of at least about 200° F. only the portions of the sheet metal immediately adjacent the ribbon of resin, fixture means supporting the assembly with the overlapped portions of sheet metal and the ribbon in such relationship to said coils without any substantial restraining of the overlapped sheet metal portions from flexing and moving due to being heated to an elevated temperature by the current applied to said coils, and while subsequently cooling sufficiently for the resin to at least partially bond them together, and control means for applying the alternating current produced by the power supply to both of the coils for not more than about fifteen seconds to heat to an elevated temperature the ribbon of plastic resin to a curing temperature to at least partially cure the resin and bond together the overlapped sheet metal portions of the assembly without any significant distortion or warping of the assembly.

8. The apparatus of claim 7 wherein said fixture means has a pair of fixtures mounted in generally opposed face to face relation and each carrying one of said coils of said pair of coils, and the apparatus also comprises drive means constructed and arranged to move at least one of said fixtures toward and away from the other of said fixtures to close and open the fixtures such that when the fixtures are open the sheet metal assembly can be positioned between the fixtures and when the fixtures are closed both of the coils are accurately positioned adjacent overlapped portions of the sheet metal assembly with the resin therebetween, and after the current from the power supply has been applied to the coils the fixtures can be opened to permit the sheet metal assembly to be removed from between the fixtures.

9. The apparatus of claim 8 which also comprises at least one pair of complimentary electrical connectors each carried by one of said fixtures and constructed and arranged to electrically disconnect the pair of coils from each other when the fixtures are opened and to electrically connect the coils only when the fixtures are closed.

10. The apparatus of claim 9 wherein said coils and pair of electrical connectors are constructed and arranged such that when said fixtures are closed said coils are electrically connected in series.

11. The apparatus of claim 9 wherein said pair of electrical connectors also comprises normally open contactors and an actuator means operably associated with said contactors and constructed and arranged to close said contactors only after said fixtures are fully closed by said drive means and to open said contactors before said fixtures are opened by said drive means.

12. The apparatus of claim 8 wherein when the sheet metal assembly is received between said fixtures and wherein said fixtures are constructed and arranged such that when they are fully closed the portions of the assembly adjacent the coils are essentially unrestrained from expanding and moving due to heating of the assembly and the resin by the current applied to said coils.

13. The apparatus of claim 8 wherein said fixtures have complimentary portions constructed and arranged so that when said fixtures are closed they encircle and enclose both the sheet metal assembly and the coils to prevent contact therewith by operating personnel when such alternating current is applied to said coils to heat the resin.

14. The apparatus of claim 7 wherein said power assembly produces a current having a power of at least about 350 watts per square inch of the ribbon of resin to be heated during the period in which the current is applied to both of said coils.

15. The apparatus of claim 7 wherein the coils of said pair are electrically connected in series when current produced by said power supply has a power of at least about 350 watts per square inch of the ribbon of resin to be heated during the period in which said current is applied to both of said coils.

16. The apparatus of claim 7 which also comprises a transfer mechanism having a work station, at least two idle stations, and at least two carriers each movable between said work station and at least one of said idle stations, a first pair of fixtures carried by one of said carriers and having a first pair of said induction coils with one coil of said first pair in each of said first fixtures, a second pair of fixtures carried by the second one of said carriers and having a second pair of said induction coils with one coil of said second pair in each of said second fixtures, and an actuator to drive said transfer mechanism to move said carriers such that any one of said pairs of fixtures can be moved into said work station with all the remaining pairs of said fixtures being in idle stations, whereby a predetermined desired pair of fixtures can be transferred into said work station for use in heating the resin of a sheetmetal assembly to an elevated temperature.

17. The apparatus of claim 16 which also comprises a pair of complementary electrical connectors each carried by one of said fixtures of each pair of fixtures and constructed and arranged to electrically disconnect the pair of coils of their associated fixtures from each other when such fixtures are open and to electrically connect such coils only when such fixtures are closed.

18. The apparatus of claim 17 wherein each pair of electrical connectors also comprises normally open contactors, the apparatus also comprises an actuator means operably associated with the contactors of the pair of fixtures in the work station and constructed and arranged to close such contactors only after such fixtures are fully closed by said drive means and to open such contactors before such fixtures are opened by said drive means.

19. The apparatus of claim 18 wherein said connectors comprise at least two spaced apart pins of an electrically conductive material carried by one of the fixtures of each pair, a complementary receptacle for each of said pins carried by the other fixture of each pair, and said contactors are associated with said receptacle and carried by such other fixture of each pair of fixtures.

20. The apparatus of claim 7 wherein said power supply produces such alternating current at a frequency of at least about 50,000 Hz and said control means applies such alternating current to both of said coils for not more than about ten seconds.

21. The apparatus of claim 7 wherein said power supply produces such alternating current at a frequency of at least about 50,000 Hz and said control means applies such alternating current to both of said coils for not more than about six seconds.

22. The apparatus of claim 7 wherein said fixture means disposes each said coil within about 0.03 to 0.35 of an inch from one sheet metal portion engaging the plastic resin.

* * * * *